UNITED STATES PATENT OFFICE.

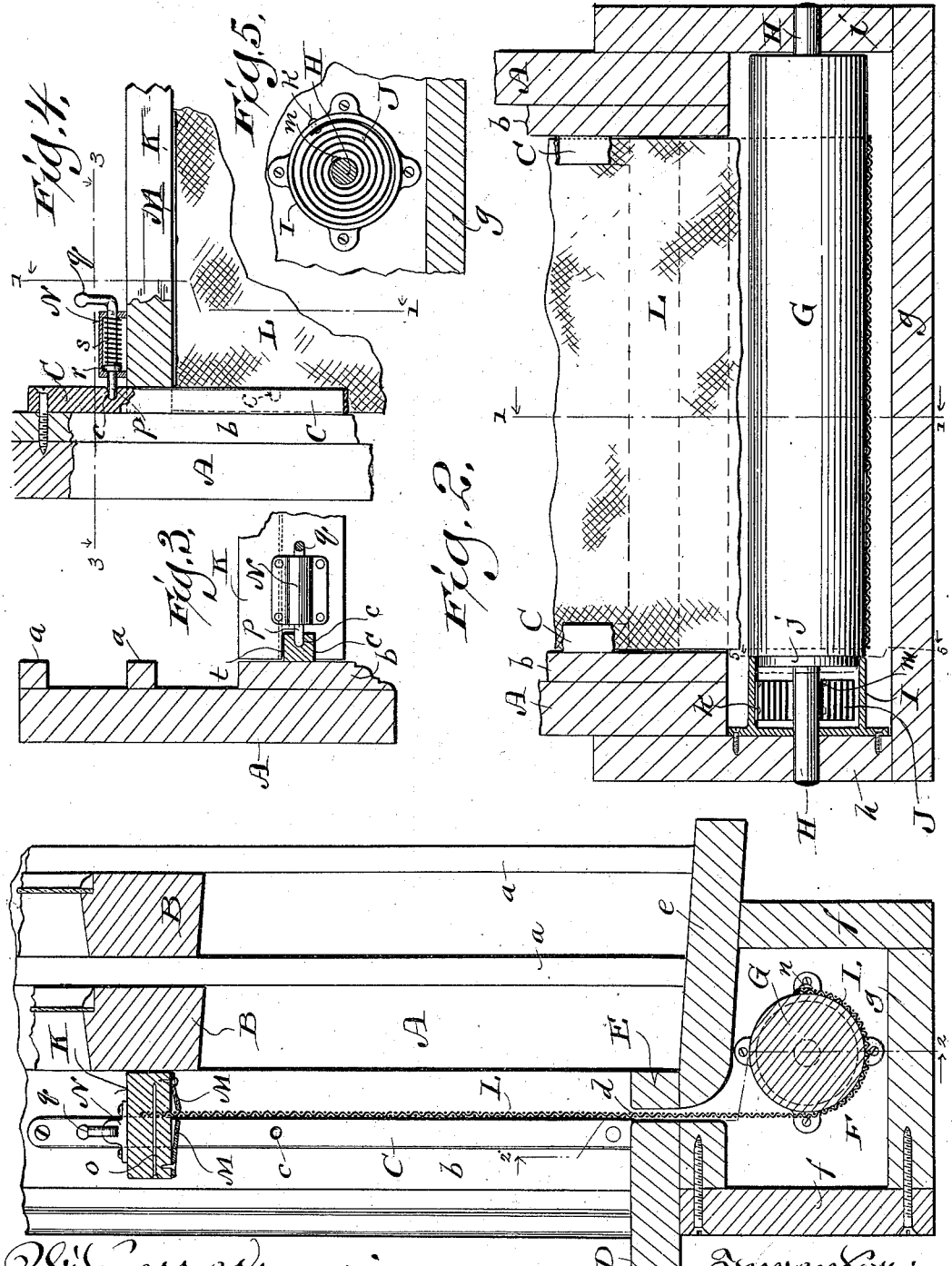

MELCHIOR ZUGERMAYER, OF MILWAUKEE, WISCONSIN, ASSIGNOR OF ONE-HALF TO CASPAR WAGNER, OF SAME PLACE.

WINDOW CASING AND SCREEN.

SPECIFICATION forming part of Letters Patent No. 559,019, dated April 28, 1896.

Application filed July 22, 1895. Serial No. 556,732. (No model.)

*To all whom it may concern:*

Be it known that I, MELCHIOR ZUGERMAYER, a subject of the German Emperor, and a resident of Milwaukee, in the county of Milwaukee and State of Wisconsin, have invented certain new and useful Improvements in Window Casings and Screens; and I do hereby declare that the following is a full, clear, and exact description thereof.

My invention has especial reference to the construction of window-casings for the reception and adjustment of movable insect-screens, as well as in the attachment and operation of said screens; and it consists in certain peculiarities of construction and combination of parts, as will be fully set forth hereinafter and subsequently claimed.

In the drawings, Figure 1 is a vertical sectional view of a window casing and screen embodying my present invention, taken on the line 1 1 of Figs. 4 and 2. Fig. 2 is a transverse vertical sectional view on the line 2 2 of Fig. 1. Fig. 3 is a horizontal sectional detail view on the line 3 3 of Fig. 4. Fig. 4 is a detail view, partly broken away or in section, to better illustrate certain features of construction. Fig. 5 is a detail sectional view on the line 5 5 of Fig. 2.

Referring to the drawings, A represents a window-casing having the usual stops $a\,a$ and moldings $b$, to form between them grooves or seats for the side edges of the sashes B B, while secured to the said moldings $b$ are vertical strips C, which are, preferably, of metal with perforations $c$ therein at intervals.

D E represent a horizontal window-sill projecting into the room, divided as shown at $d$, and $e$ represents the externally-projecting and preferably obliquely-inclined sill, and beneath these sills is a box F, formed by the vertical walls $f\,f$, base $g$, and end pieces $h\,i$, to receive the roller G, whose axle H finds bearing in the said end pieces $h\,i$.

I is a housing secured to the end piece $h$ and receiving the reduced adjacent end $j$ of the said roller G, which housing contains a volute spring J, one end of which spring is secured to said housing, as shown at $k$, while the other end of the spring is secured to the axle H of the roller, as shown at $m$.

L represents the screen, formed, preferably, of a continuous sheet of flat wire-netting, one end of which is secured to the roller G, as by nails or tacks $n$, while the other end passes up through the opening $d$ in the divided window-sill D E to a bar K, which is longitudinally kerfed or slotted to receive the same, and to which bar this end of the screen is secured, as by nails $o$. To the under side of this bar strips of rubber or analogous material M are preferably secured, as shown best in Fig. 1. On the upper side of this bar K, and at each end thereof (one end only being shown in the drawings, but the two ends being alike) is secured a housing N, containing a latch-pin $p$, having a finger-pull $q$ and a collar $r$ and spring $s$, as shown best in Fig. 4.

The operation of my device will be readily understood from the foregoing description of its construction, taken in connection with the accompanying drawings.

The act of raising up the bar K and screen L to the position shown in Fig. 1 winds the spring J, and when the said bar is just beneath the desired holes $c$ the spring-controlled latch-pins $p$ in the housings N will automatically enter the said holes $c$, thereby keeping the screen L raised the desired height, and when this attachment is released by pulling inwardly on the finger-pulls $q$ the spring J will begin to unwind, thereby instantly pulling the bar K down on the window-sill D E and winding up the screen L on the roller G. The bar and screen, in their movement up and down, are guided by the strips C, (said bar being slotted at the ends, as shown at $t$, to receive said strips,) and by reason of the rubber or analogous strips M on the under side of said bar K the latter goes noiselessly to place, besides which the said strips M fit snugly against the screen over the opening $d$ on the window-sill and keep out dust, dirt, water, and other foreign matter from the box F, and insure that the screen L shall always be clean and dry, and therefore the same need not be detached in the winter or when not in use. By making the strips C of metal I avoid shrinkage or swelling of the same and insure that the perforations or holes $c\,c$ therein shall always be in proper line to receive the spring-controlled latch-pins *p p*, and the edges of said strips form smooth guides for the side edges of the screen L.

In place of the described latch-pins *p* and holes *c*, it is obvious that any suitable catches or fastening devices and recesses for engagement therewith may be provided without departing from the spirit of my invention, and, further, while our device is primarily intended for use with a wire-netting insect-screen, that any flexible screen might be similarly arranged and be within the scope of my invention.

Having thus described my invention, what I claim as new, and desire to secure by Letters Patent, is—

In a window-casing, the combination with vertical guide-strips, provided at intervals with suitable recesses or perforations, a window-sill divided by a longitudinal vertical slot or opening, a receptacle beneath said window-sill, a spring-roller journaled within said receptacle, a transverse horizontal bar adapted to move vertically upon said guide-strips, catches upon said bar for engagement with said recesses or perforations, a flexible screen secured to said bar and said roller and adapted to pass through the slot or opening in the window-sill, and strips of rubber or analogous material secured to the under side of said bar, substantially as set forth.

In testimony that I claim the foregoing I have hereunto set my hand at Milwaukee, in the county of Milwaukee and State of Wisconsin, in the presence of two witnesses.

MELCHIOR ZUGERMAYER.

Witnesses:
H. G. UNDERWOOD,
H. T. FORMANN.